Patented June 17, 1952

2,600,384

UNITED STATES PATENT OFFICE 2,600,384

VINYL ESTER COPOLYMERS

La Verne N. Bauer, Philadelphia, Harry T. Neher, Bristol, and William L. Van Horne, Philadelphia, Pa., assignors to Rohm & Haas Company, Philadelphia, Pa., a corporation of Delaware No Drawing. Application May 12, 1950,
Serial No. 161,721

3 Claims. (Cl. 260—85.7)

This invention deals with copolymers from vinyl stearate, margarate, or palmitate and vinyl laurate in which the mole ratio of the vinyl stearate or palmitate copolymerized with the vinyl laurate is from about 1:1 to 1:10. It further concerns compositions of reduced pour point which consist essentially of a wax-containing hydrocarbon fluid having dissolved therein a said copolymer.

Polyvinyl esters of various kinds and sizes of carboxylic acids have been prepared and it has been proposed to modify vinyl esters of lower monocarboxylic acids by addition thereto of a small amount of a larger polyvinyl ester or by copolymerization of a vinyl ester of a lower monocarboxylic acid with a small amount of a vinyl ester of a higher carboxylic acid. For example, modification of polyvinyl acetate has been proposed by copolymerization of 90 to 100 parts of vinyl acetate with 5 to 10 parts of vinyl palmitate or vinyl oleate. The resulting products swell slightly in aromatic solvents such as benzene or toluene and are useful in pressure molding.

In contrast to previously known copolymers, the copolymers of this invention are freely soluble in hydrocarbons and are unsuitable for molding. Their ready solubility in petroleum oils, their thermal stability, and their capacity to improve properties of these oils impart to the copolymers of this invention an unforeseen and valuable utility. In particular the copolymers of this invention are peculiarly effective in depressing the pour point of wax-containing hydrocarbon liquids. This property depends upon the particular vinyl esters which are copolymerized and the proportion of vinyl stearate or palmitate to vinyl laurate. Copolymers from these two kinds of vinyl esters are effective pour point depressants from a molecular size of the order of 1000 up to very high molecular weights, such as 50,000 or more. With molecular weights of the order of 5,000 or more the copolymers are useful as thickeners and improvers of the viscosity index of lubricating oils and the like.

While the addition of resinous materials to oils is known, but few such materials in fact give a depression of pour points. Many resinous or polymeric materials raise the pour point; others do not alter the pour point. An appreciable lowering of pour point appears as the exceptional outcome of the addition of polymeric materials.

The preparation of vinyl stearate, vinyl heptadecanoate, vinyl palmitate, and vinyl laurate is accomplished by known methods. They are made by running acetylene into the corresponding carboxylic acid in the presence of a zinc or cadmium catalyst. The catalyst is desirably the zinc or cadmium salt of the carboxylic acid being reacted. Good yields of the vinyl esters are obtainable at 150°–200° C. under pressure. The vinyl esters are distillable at low pressures. Thus, vinyl stearate distills at 167° C./2-4 mm., vinyl palmitate at 165° C./2-4 mm., and laurate at 123° C./4 mm. or 101° C./0.73 mm.

The vinyl esters of long-chained carboxylic acid are also available through acidolysis or transesterification of an ester of a lower carboxylic acid with the long-chained acid. For example, vinyl acetate heated with palmitic acid in the presence of mercuric oxide and sulfuric acid or boron trifluoride as catalysts yields vinyl palmitate.

The long-chained vinyl esters may be made from pure stearic, margaric, or pelmitic acids or from commercial mixtures of stearic and palmitic acids.

To prepare the copolymers of this invention the vinyl ester, $CH_2=CHOOCR$, where R is an alkyl group having a chain of 15 to 17 carbon atoms, is mixed with vinyl laurate,

$CH_2=CHOOCC_{11}H_{23}$ in a proportion from one mole of the former to one mole of the latter to one mole of the former to ten moles of the latter. The mixed vinyl esters are extended with an inert solvent such as benzene, toluene, xylene, or a close cut naphtha and copolymerization is initiated by means of a polymerization catalyst in an inert atmosphere. Nitrogen serves as a suitable inert gas to exclude oxygen from the copolymerizing mixture. Copolymerization may also be effected in a lubricating oil.

As catalysts for copolymerization there are usually used organic peroxides or acyclic azo compounds, which serve as free radical catalysts. Typical of the azo catalysts is azodiisobutyronitrile. Suitable peroxides are acetyl peroxide, caproyl peroxide, lauroyl peroxide, benzoyl peroxide, dibenzal peroxide, di-tert.-butyl diperphthalate, tert.-butyl perbenzoate, 2,2-bis(tert.-butylperoxy)butane, methyl ethyl ketone peroxide, di-tert.-butyl peroxide, tert.-butyl hydroperoxide, etc. An amount of catalyst is taken to induce copolymerization. Amounts of catalyst used may be varied from 1% to 16% of the weight of mixed esters. In a preferred method the concentration of catalyst may be 2% to 5% of the monomeric esters at the start and catalyst is added as copolymerization proceeds. Solvent may likewise be added from time to time.

One or more of the catalysts are added to the solution of mixed esters and the mixture is heated to 75° C. to 150° C. One range of temperature may be used at the start and another as copolymerization proceeds. Temperatures selected depend upon solvent chosen, concentration of esters, concentration of catalyst, copolymerization schedule, and size of copolymer desired as product.

Typical procedures for preparing copolymers of this invention are given in the following illustrative examples, in which parts are by weight.

*Example 1*

A reaction vessel equipped with stirrer, thermometer, reflux condenser, and gas inlet tube was flushed with nitrogen and heated to 100° C. Thereto was slowly added a mixture of 65 parts of vinyl laurate, 35 parts of vinyl stearate, 5 parts of benzoyl peroxide, and 20 parts of toluene. By the end of 1.75 hours all of the mixture had been introduced into the reaction vessel. At 2.4 hours there was added 17 parts of toluene and the temperature was lowered to 90° C. At 2.75 hours 2 parts of benzoyl peroxide and 9 parts of toluene were added. At 3 hours 104 parts of toluene was added. At 5.2, 6.2, and 6.8 hours there were added respectively 5, 1, and 1 part portions of benzoyl peroxide, each in about half its weight of toluene. Heating was discontinued at 8 hours but stirring was continued until the batch had cooled to 40° C. The product was a 31% solution of copolymer in toluene. A 30% solution in toluene had a viscosity of 132 centistokes at 100° F.

A portion of the toluene solution was mixed with an equal weight of a light lubricating oil and heated to drive off the toluene. Heating was carried to 140° C./2 mm. This oil solution was particularly suitable for adding the copolymer to a waxy lubricataing oil in the concentrations needed to give good pour-depressing action.

*Example 2*

A mixture of 60 parts of vinyl stearate, 40 parts of vinyl laurate, 4 parts of benzoyl peroxide, and 87 parts of toluene was charged over a period of 1.6 hours to the reaction vessel heated at 120° C., a temperature maintained for 3.2 hours. The temperature was then maintained at 102° C. until the end of 7 hours. Four additions of benzoyl peroxide of 3 parts each were made at hourly intervals. Additions of toluene from time to time totalled 63 parts. The product was a 39.2% solution of copolymer in toluene. At 30% of copolymer in toluene the viscosity of the solution was 7 centistokes at 100° F.

*Example 3*

A mixture of 25 parts of vinyl stearate, 75 parts of vinyl laurate, 4 parts of benzoyl peroxide, and 100 parts of toluene was copolymerized as in Example 2, starting at 120°–124° C. for three hours and continuing at 100° C. for another 5 hours. Additions of peroxide amounted to 10 parts and of toluene to 70 parts. The product obtained was a 30.8% solution of copolymer in toluene. At 30% of copolymer in toluene the viscosity was 17 centistokes at 100° F.

*Example 4*

A mixture of 35 parts of vinyl stearate, 65 parts of vinyl laurate, 5 parts of benzoyl peroxide, and 15 parts of toluene was heated at 90°–100° C. for 3.5 hours and for 5 hours more at 89°–90° C. Additions of benzoyl peroxide were made from time to time in a total of 10 parts. Additions of solvent totalled 199 parts. The product was a 31% solution of copolymer in toluene. For a 30% solution the viscosity was 672 centistokes at 100° F.

*Example 5*

A mixture of 120 parts of vinyl stearate, 880 parts of vinyl laurate, 5 parts of lauroyl peroxide, and 500 parts of toluene was slowly run into the reaction vessel which had been flushed with nitrogen and heated to 100° C. and which temperature was maintained for 8 hours, when heating was discontinued. Additions of lauroyl peroxide were made of 2, 5, 2, and 0.8 parts at 3.4, 5, 6 and 7 hours respectively. Toluene was added at 3.4 and 5 hours in portions of 100 parts and at 7.7 hours in an amount of 180 parts. The product was a 54% solution of copolymer in toluene. A 30% solution of the copolymer in toluene had a viscosity of 30 centistokes at 100° F.

A mixture of 79 parts of the 54% solution, 131 parts of the 30% solution, and 123 parts of a light lubricating oil was heated up to 140° C./3 mm. to yield a 37.6% solution of copolymer in oil. This was a convenient form of the copolymer for addition to waxy oils.

*Example 6*

A mixture of 55 parts of vinyl stearate, 45 parts of vinyl laurate, 5 parts of ethyl azodiisobutyrate, and 40 parts of xylene was heated at 100° C. under a nitrogen atmosphere. Additions of catalyst were made at 2.25, 4.25, 5, and 6 hours in amounts of 2, 5, 2, and 1 parts respectively. Heating was discontinued at 23 hours, toluene in an amount of 176 parts was added, and stirring was continued until the product had cooled below 40° C. The product was a 25.7% solution of copolymer in solvent with a viscosity of 3 centistokes at 100° F.

*Example 7*

A mixture of 119 parts of vinyl palmitate, 381 parts of vinyl laurate, 25 parts of benzoyl peroxide, and 250 parts of toluene was added to the reaction vessel heated at 120° C. over the course of 1.8 hours. After about 200 parts of the mixture had been run in, the reacting mixture was diluted with 250 parts of toluene. Other additions of toluene were 176, 176, 87, and 87 parts at 2.8, 4.8, 5.8, and 6.8 hours respectively. Additions of peroxide catalyst were 10, 25, 10, and 4 parts at the above times. Heating was discontinued at 7.8 hours. The product was a 32.5% solution of copolymer. A 30% solution of copolymer in toluene had a viscosity of 12 centistokes at 100° F.

The effect on the pour point of wax-containing hydrocarbons was determined by dissolving a defined copolymer in such hydrocarbon fluid in an amount sufficient to depress the pour point and subjecting the resulting solution to the A. S. T. M. pour test (D97—47). In some instances, this test was supplemented or replaced with shock chilling and/or maximum pour tests. Cf. Proc. A. S. T. M. 45, Appendix I, p. 244 (1945). The shock chilling determination is made by observing the sample during the initial cooling step with the cooling jacket at −60° F.

The useful range for using the copolymers of this invention in hydrocarbon fluids is from a concentration of about 0.01% up to about 5%. In any case, the amount of copolymer dissolved in a hydrocarbon of waxy pour point should be sufficient to depress the normal pour point of the said hydrocarbon.

For the evaluation of the copolymers three oils were selected. One was a 150 Pennsylvania neutral having a pour point of +25° F. (Oil I). This was an oil which proved to be relatively sensitive to the action of pour point depressants. A second oil (Oil II) was a 500 Mid-Continent solvent-extracted neutral (S. A. E. 30) having a pour point of +25° F. This was known to be an oil which was not readily changed as to its pour point. The third oil (Oil III) was selected to study effects in heavy oils. It was an S. A. E. 90 gear oil, compounded from 30 parts of a 180 Pennsylvania neutral and 70 parts of a 150 Pennsylvania bright stock. It had a pour point also of +25° F.

A copolymer prepared from vinyl stearate and vinyl laurate in a 1:1 mole ratio was examined in Oil I. Pour points were determined as −20° F., −20° F., and −5° F. at 0.5%, 0.25%, and 0.1% respectively.

A copolymer was prepared from vinyl stearate and vinyl laurate in a 1:3.2 mole ratio. At 0.5% in Oil I the pour point was −35° F.; at 0.25%, −30° F.; and at 0.1%, −25° F. In Oil II at 0.5% the pour point was −5° F. by shock chilling and by the maximum pour test. In Oil III at 0.1% the pour point was −10° F.

A copolymer based on vinyl stearate and vinyl laurate in a 1:4.13 mole ratio gave pour points in Oil I of −35° F., and −25° F. at 0.5% and 0.25% respectively. In Oil II at 0.5% it reduced the pour point to −20° F. under shock chilling.

A copolymer based on the same two vinyl esters but in a 1:10 mole ratio reduced the pour point of Oil I to −15° F. when dissolved therein at 0.5%.

Solutions of 0.5% and 0.25% in Oil I of polyvinyl stearate were examined. The pour points of these solutions were at least as high as that of the oil free of polymer. No depression resulted when the polymer was dissolved in Oil II or in Oil III. A solution of a polyvinyl laurate was made in Oil I at 0.5%. The pour point of the solution was +25° F. A mixture was made of polyvinyl stearate and polyvinyl laurate in a mole ratio of 1:2. The mixture was dissolved in Oil I at 0.5%. The pour point of this solution was +25° F.

A copolymer made from vinyl stearate and vinyl laurate in a 1:3 mole ratio was tested in Oil I at 0.5% and 0.25%. The pour points found were −30° F. and −30° F. respectively. At 0.5% in Oil II the pour point was −5° F. by the maximum pour test and −20° F. by shock chilling. At 0.1% in Oil III the pour point was −5° F.

This copolymer imparted to a 30% solution in toluene a viscosity of 158 centistokes at 100° F. This copolymer was also dissolved in a light oil and the viscosities of solutions at three concentrations were determined. The oil itself had viscosities of 5.25 centistokes at 210° F. and 45.1 centistokes at 100° F., giving a viscosity index of 16. A 0.8% solution of copolymer in this oil had viscosities of 6.28 centistokes at 210° F. and 53.55 centistokes at 100° F., yielding a viscosity index of 60. A 2% solution of the copolymer in the oil had viscosities of 8.16 centistokes at 210° F. and 68.6 centistokes at 100° F., yielding a viscosity index of 94. A 3.2% solution of the copolymer in the oil had viscosities of 10.36 centistokes at 210° F. and 87.4 centistokes at 100° F., giving a viscosity index of 108.

A copolymer from vinyl palmitate and vinyl laurate in a 1:4 mole ratio gave pour points of −35° F., −30° F., and −15° F. at 0.5%, 0.25%, and 0.1% respectively in Oil I. In Oil II at 0.5% it gave a pour point of −15° F. by either the shock cooling or maximum pour methods.

The copolymers of this invention are new. They are characterized by their solubility in hydrocarbon fluids and their capacity for imparting thereto an increase in viscosity which is coupled with some improvement in viscosity index and lowering of pour point when the pour point results from a wax content. These copolymers are useful not only in petroleum lubricating oils having waxy pour points but also in fuel oils and diesel fuels and the like. The fluid hydrocarbons upon which these copolymers act are generally from paraffinic or naphthenic stocks. These copolymers may be used in conjunction with other additives, such as antioxidants, oiliness agents, detergents, and the like.

Compositions based on the copolymers of this invention dissolved in a wax-containing hydrocarbon liquid usually contain from 0.01% to 5% of the copolymer. There are some oils which are so susceptible to the action of the copolymers that a concentration of even 0.01% or 0.02% gives a practical depression of the pour point. Some oils advantageously may be treated with 5% or even more of one of these copolymers. This is particularly true in cases in which an increase in viscosity or an improvement in viscosity index is desired along with depression of pour point. In most cases concentrations of 0.05% to 2% of a copolymer are sufficient and highly effective for lowering the pour point and are preferred.

These copolymers may be used in conjunction with other polymeric materials and other types of oil-additives, such as antioxidants, wear-resisting agents, detergents, and the like.

We claim:

1. A copolymer of (A) a vinyl ester of a saturated aliphatic monocarboxylic acid, RCOOH, wherein R is an alkyl group having a carbon chain of 15 to 17 carbon atoms, and (B) vinyl laurate, the proportion of (A) vinyl ester units in said copolymer to (B) vinyl laurate units being from 1:1 to 1:10.

2. A copolymer of (A) vinyl palmitate and (B) vinyl laurate, wherein the proportion of vinyl palmitate units in said copolymer to vinyl laurate units is 1:1 to 1:10.

3. A copolymer of (A) vinyl stearate and (B) vinyl laurate, wherein the proportion of vinyl stearate units in said copolymer to vinyl laurate units is 1:1 to 1:10.

LA VERNE N. BAUER.
HARRY T. NEHER.
WILLIAM L. VAN HORNE.

REFERENCES CITED

The following references are of record in the file of this patent:

UNITED STATES PATENTS

| Number | Name | Date |
| --- | --- | --- |
| 2,020,714 | Wulff et al. | Nov. 12, 1935 |
| 2,118,864 | Reppe | May 31, 1938 |
| 2,263,598 | Stark et al. | Nov. 25, 1941 |

FOREIGN PATENTS

| Number | Country | Date |
| --- | --- | --- |
| 395,478 | Great Britain | July 20, 1933 |